US012057923B2

(12) United States Patent
Gateno et al.

(10) Patent No.: US 12,057,923 B2
(45) Date of Patent: Aug. 6, 2024

(54) SATELLITE COMMUNICATION SYSTEM, COMMUNICATION TERMINAL, AND METHOD OF OPERATION

(71) Applicant: Hughes Network Systems, LLC, Germantown, MD (US)

(72) Inventors: Leon Gateno, San Diego, CA (US); Bill Whitmarsh, San Diego, CA (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 301 days.

(21) Appl. No.: 17/522,152

(22) Filed: Nov. 9, 2021

(65) Prior Publication Data

US 2023/0146480 A1 May 11, 2023

(51) Int. Cl.
*H04B 7/185* (2006.01)
(52) U.S. Cl.
CPC ............................... *H04B 7/18513* (2013.01)
(58) Field of Classification Search
CPC ............... H04W 7/185–195; H04B 7/185–195
See application file for complete search history.

(56) References Cited

U.S. PATENT DOCUMENTS

| | | | |
|---|---|---|---|
| 2018/0097285 A1* | 4/2018 | Tang | H04B 7/185 |
| 2018/0097888 A1* | 4/2018 | Roy | H04L 43/028 |
| 2018/0109263 A1* | 4/2018 | Wanner | H03B 5/32 |
| 2018/0165560 A1* | 6/2018 | Philip | H04B 5/0056 |
| 2020/0200618 A1* | 6/2020 | Brederlow | G01L 1/225 |
| 2022/0360320 A1* | 11/2022 | Miao | H04W 56/0035 |

FOREIGN PATENT DOCUMENTS

CN 110855242 A * 2/2020 ............ H03B 1/04

* cited by examiner

*Primary Examiner* — Raymond S Dean
(74) *Attorney, Agent, or Firm* — GLOBAL IP COUNSELORS, LLP (57) ABSTRACT

A communication terminal and its method of use are disclosed herein. In an embodiment, a communication terminal includes at least one of a transmitter or a receiver, a common reference device, a vibration sensor, and a controller. The at least one of the transmitter or the receiver is configured for transmission of communications. The common reference device is configured to provide a common reference for at least one of the frequency or timing of the communications sent or received by the at least one of the transmitter or the receiver. The vibration sensor is configured to detect vibrations. The controller is configured to adjust a control voltage applied to the common reference device based on the vibrations detected by the vibration sensor.

20 Claims, 6 Drawing Sheets

SATELLITE COMMUNICATION SYSTEM, COMMUNICATION TERMINAL, AND METHOD OF OPERATION

BACKGROUND

Field of the Invention

The present disclosure generally relates to a communication terminal and its system and method of operation. In particular, the present disclosure relates to a communication terminal configured to function effectively when experiencing vibrations and its method of compensating for the vibrations.

Background Information

Many portable satellite terminals operate in mobile applications which cause vibrations. When a terminal experiences vibrations, all of its components also experience the vibrations. When the terminal uses a crystal oscillator as a common reference for frequency or timing, subjecting the crystal oscillator to vibrations causes its phase noise to degrade and the performance of the terminal suffers. In some cases the degradation of the phase noise can cause the terminal to fail completely. This makes it necessary to manufacture terminals with expensive crystal oscillators which do not have phase noise degraded by vibrations.

SUMMARY

It has been discovered that it is desirable to manufacture communication terminals (e.g., portable satellite terminals) with less expensive parts. However, less expensive crystal oscillators typically experience more phase noise degradation due to vibrations. The present disclosure provides systems and methods which compensate for the noise caused by vibration, thus enabling communication terminals to be manufactured with less expensive parts.

In view of the state of the known technology, one aspect of the present disclosure is to provide a communication terminal. The communication terminal includes at least one of a transmitter or a receiver, a common reference device, a vibration sensor, and a controller. The at least one of the transmitter or the receiver is configured for transmission of communications. The common reference device is configured to provide a common reference for at least one of frequency or timing of the communications sent or received by the at least one of the transmitter or the receiver. The vibration sensor is configured to detect vibrations. The controller is configured to adjust a control voltage applied to the common reference device based on the vibrations detected by the vibration sensor.

Another aspect of the present disclosure is to provide a method of transmitting or receiving communications by a communication terminal experiencing vibrations. The method includes measuring vibrations experienced by the communication terminal in at least one axis, determining a total error based on the measured vibrations, adjusting a control voltage applied to a common reference device based on the total error, and sending or receiving one or more communication using the common reference device for at least one of frequency or timing of the one or more communication.

Another aspect of the present disclosure is to provide a satellite communication system. The satellite communication system includes at least one communication terminal, at least one satellite, and at least one gateway. The at least one communication terminal is installed at a location that experiences vibrations. The at least one communication terminal includes a common reference device configured to provide a common reference for at least one of frequency or timing of communications sent or received by the at least one communication terminal. The at least one gateway is configured to communicate with the at least one communication terminal via the at least one satellite. The at least one communication terminal is configured adjust a control voltage applied to the common reference device based on detected vibrations and thereafter use the common reference device during transmission of communications with the at least one gateway via the at least one satellite.

Also, other objects, features, aspects and advantages of the disclosed communication terminal, communication system and method of operation will become apparent to those skilled in the art in the field of portable satellite terminals from the following detailed description, which, taken in conjunction with the annexed drawings, discloses preferred embodiments of a communication terminal, system and method with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
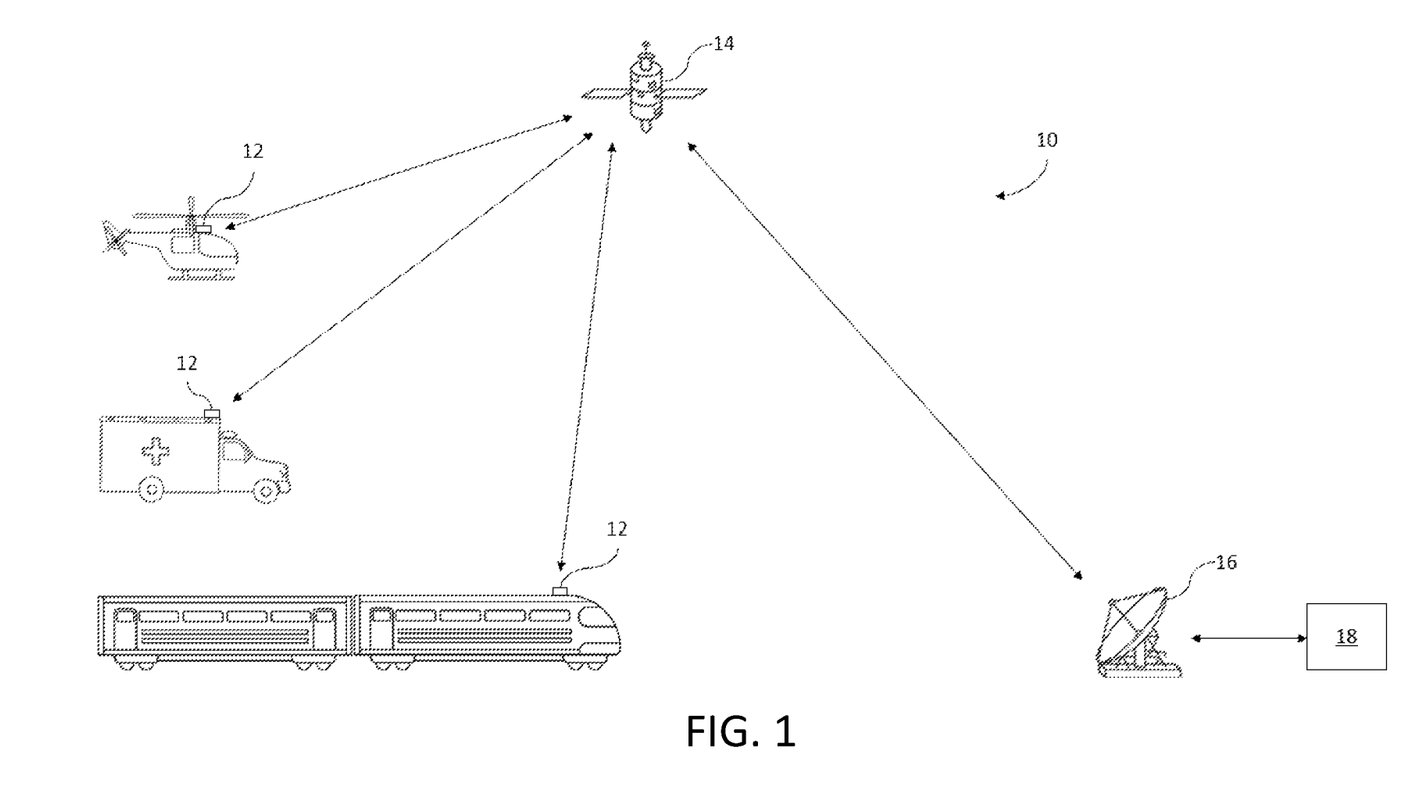
FIG. 1 illustrates an example embodiment of a satellite communication system in accordance with the present disclosure.

FIG. 1 illustrates an example embodiment of a satellite communication system 10 in accordance with the present disclosure. In the illustrated embodiment, the system 10 includes at least one communication terminal 12. The communication terminal 12 can be, for example, a portable satellite terminal. The communication terminals 12 are installed at locations that experience vibrations. Here, each of the communication terminals 12 is a mobile communication terminal installed on a respective mobile vehicle. The communication terminals 12 disclosed herein are particularly suited for mobile applications which experience turbulence, for example, for installation on automobiles, trains, boats, helicopters, airplanes and/or other vehicles. The communication terminals 12 disclosed herein are also particularly suited for nonmobile applications which experience vibrations, for example, for installation at oil wells or other structures which experience vibrations. These mobile and nonmobile applications have different vibration specifications, and the communication terminal 12 of the present disclosure is configured to self-correct based on the vibrations experienced at a particular location such that the communication terminal 12 can function regardless of the specific vibration specifications where it is installed.

In the illustrated embodiment, the system 10 includes at least one satellite 14, at least one gateway 16 and/or a network management system 18. The communication terminals 12, the satellite 14 and the gateway 16 typically communicate with each other over a radio frequency link, such as a Ku-band link, a Ka-band link, an L band link, an S band link or any other suitable type of link as understood in the art. Thus, the communication terminals 12 are configured to communicate with the gateway 16 via the satellite 14, and likewise the gateway 16 is configured to communicate with the communication terminals 12 via the satellite 14. The gateway 16 is further configured to communicate with the network management system 18, which communicates with remote sites, such as web content providers, via the Internet, cloud storage, or other communication networks as understood in the art. The gateway 16 and/or the network management system 18 can further include or be configured as an inroute group manager (IGM) which controls the bandwidth allocations to the communication terminals 12 (e.g., on an inroute or inroute group basis) and correspondingly controls and administers the bandwidth allocation approaches.

The system 10 can use various signal protocols to exchange communication signals between the communication terminal 12 and the gateway 16 via the satellite 14. The system 10 is particularly advantageous for signal protocols which depend on the accuracy of frequencies and timing to synchronize the communication terminals 12 with the satellite 14 and/or gateway 16. In an example embodiment, the system 10 can use a Time-Division Multiple Access (TDMA) signal protocol. As will be understood by those of ordinary skill in the art from this disclosure, TDMA is a channel access method in which data packets are transmitted within a narrow time window. In another example embodiment, the system 10 can use a Frequency-Divisional Multiple Access (FDMA) signal protocol. As will be understood by those of ordinary skill in the art from this disclosure. FDMA is a channel access method which provides different frequency bands to different data streams. Those of ordinary skill in the art will further recognize from this disclosure that there are various other signal protocols which benefit from accurate frequencies and timing at the communication terminal 12.

Figure 2:
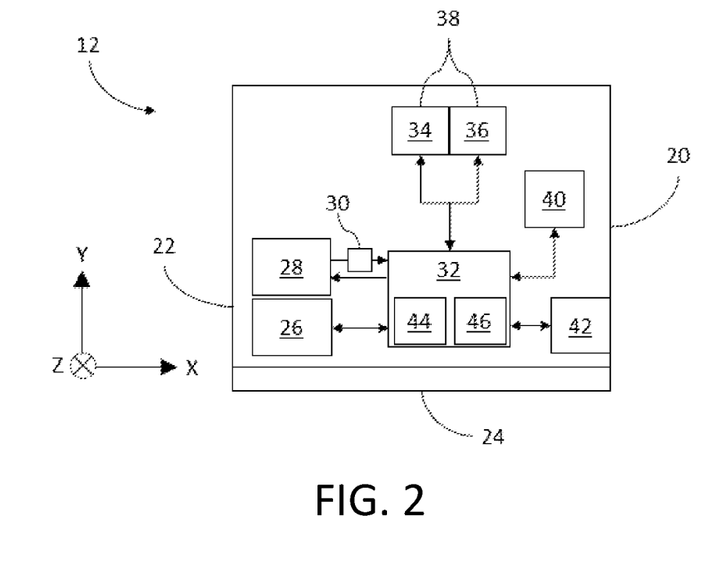
FIG. 2 illustrates an example embodiment of a communication terminal in accordance with the present disclosure.

FIG. 2 illustrates an example embodiment of the communication terminal 12 in more detail. As illustrated in FIG. 2, the communication terminal 12 includes a housing 20. In the illustrated embodiment, the housing 20 is a box-shaped structure, but the housing 20 can also be other shapes and sizes. The housing 20 further includes one or more edges 22 which can be used as a reference for the X, Y and Z axes as discussed herein. The housing 20 can be formed of any suitable material and provides an outer shell to protect the other components located therein. In an embodiment, the housing 20 further includes a coupling mechanism 24 configured to enable the housing 20 to be installed in an appropriate location, for example, to a mobile vehicle or nonmobile structure which experiences vibrations.

In the illustrated embodiment, the communication terminal 12 includes a common reference device 26, a vibration sensor 28, a controller 32, a transmitter 34 and/or a receiver 36 (e.g., a transceiver 38), a local server 40, and/or a power source 42. The controller 32 is configured to control the common reference device 26, the vibration sensor 28, the transmitter 34 and/or the receiver 36 (e.g., a transceiver 38), the local server 40, and/or the power source 42 as discussed herein.

In the illustrated embodiment, the communication terminal 12 includes a common reference device 26. The common reference device 26 provides a common reference for frequency and timing functions executed by the communication terminal 12. More specifically, the common reference device 26 functions as a common reference for at least one of the frequency and timing of communications transmitted (e.g., sent and/or received) by the transmitter 34 and/or the receiver 36. In an embodiment, the common reference device 26 is configured to keep track of time for communications sent and/or received by the transmitter 34 and/or the receiver 36. In an embodiment, the common reference device 26 is configured to stabilize frequencies for communications sent and/or received by the transmitter 34 and/or the receiver 36. In an embodiment, the common reference device 26 is configured to shift its oscillation frequency based on an applied voltage, as discussed in more detail below.

In an embodiment, the common reference device 26 includes a crystal oscillator. More specifically, the common reference device 26 includes a voltage controlled temperature compensated crystal oscillator (VCTCXO). As understood by those of ordinary skill in the art from this disclosure, a crystal oscillator typically includes an electronic oscillator circuit that uses the mechanical resonance of a vibrating crystal of piezoelectric material to create an electric signal with constant frequency. The frequency can be used to keep track of time and/or stabilize frequencies for radio transmitters and receivers. A VCTCXO is a type of crystal oscillator which uses a two-port crystal resonator with a special electrode structure, which allows the VCTCXO to compensate for temperature changes and shift its oscillation frequency independently.

In the illustrated embodiment, the communication terminal 12 includes a vibration sensor 28. The vibration sensor 28 is configured to detect vibrations experienced by the communication terminal 12. More specifically, the vibration sensor 28 is configured to measure vibrations experienced by the communication terminal 12. In an embodiment, the vibration sensor 28 is configured to measure vibrations experienced by the communication terminal 12 in multiple vectors. The multiple vectors can include the X, Y and/or Z axes (e.g., as illustrated in FIG. 2). Thus, in an embodiment, the vibration sensor 28 is configured to detect the vibrations in each of X, Y and Z axes. In an embodiment, the vibration sensor 28 is configured to measure the amplitude of vibrations in one or more respective axis, the frequency of vibrations in one or more respective axis, and/or the mode of vibrations in one or more respective axis.

In an embodiment, the vibration sensor 28 is located adjacent to the common reference device 26 within the housing 20 so as to detect vibrations experienced by the common reference device 26 (e.g., in the X, Y and Z axes) as accurately as possible. The vibration sensor 28 is further configured to output signals reflecting the detected vibrations to the controller 32 for further processing in accordance with the present disclosure. In an embodiment, the vibration sensor 14 includes a piezoelectric sensor. As understood by those of ordinary skill in the art from this disclosure, a piezoelectric sensor transforms mechanical energy into an electrical output which can be transmitted to the controller 32.

In the illustrated embodiment, the vibration sensor 28 is calibrated and positioned so that its X, Y and Z axes match the X, Y and Z axes used as a reference from the communication terminal 12. Thus, in an embodiment, the vibration sensor 28 is installed in the communication terminal such that that its X, Y and Z axes are referenced off of the edges 22 of the housing 20.

Figure 4:
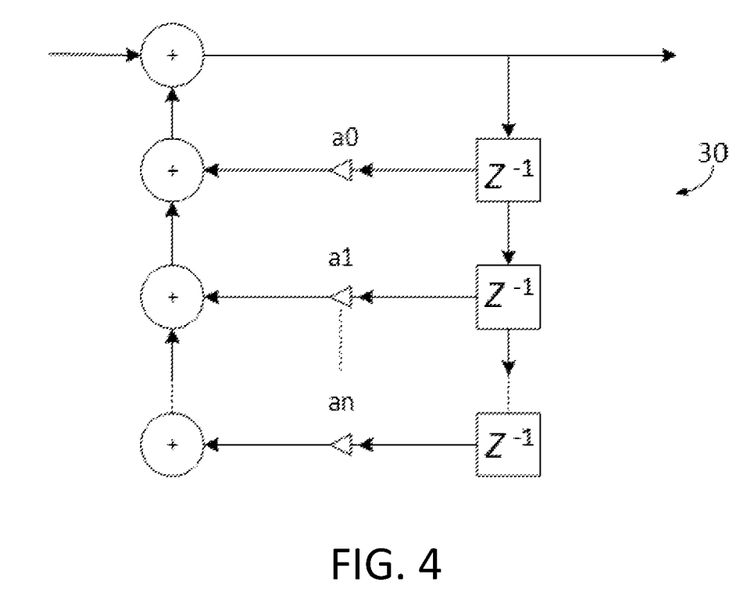
FIG. 4 illustrates an example embodiment of a low-pass filter configured for use with the communication terminal of FIG. 2.

In an embodiment, the communication terminal 12 includes one or more low-pass filter 30 at the output of the vibration sensor 28. In an embodiment, the vibration sensor 28 includes one or more low-pass filter 30. In an embodiment, the communication terminal 12 includes a low-pass filter 30 for each of the X, Y and Z axes which are being used to measure vibrations. An example embodiment of one or more low pass filter 30 is illustrated by FIG. 4. In an embodiment, each low pass filter 30 is configured to pass signals with a frequency lower than a predetermined value and attenuate signals with a frequency higher than the predetermined value. In an embodiment, each low-pass filter 30 can be added in series with a control pin to average the error and filter out noise.

In the illustrated embodiment, the communication terminal 12 includes a controller 32. As explained in more detail below, the controller 32 is configured to adjust a control voltage applied to the common reference device 26 based on the vibrations detected by the vibration sensor 28. More specifically, the controller 32 is configured to determine a total error based on the detected vibrations and adjust the control voltage applied to the common reference device 26 based on the total error. The controller 32 is configured to determine the total error based on the vibrations detected by the vibration sensor 28 in each of the X, Y and Z axes. In doing so, the controller 32 is configured to cause the common reference device 26 to shift its oscillating frequency. In this way, the communication terminal 12 is configured adjust the control voltage applied to a common reference device 26 based on detected vibrations and thereafter use the common reference device 26 during the transmission of communications with the gateway 16 via the satellite 14.

In the illustrated embodiment, the controller 32 includes a processor 44 and a memory 46. As understood in the art, the controller 32 can include a microcomputer with a control program that controls the communication terminal 12 as discussed herein. The controller 32 can also include other conventional components such as an input interface circuit, an output interface circuit, and storage devices such as a ROM (Read Only Memory) device and a RAM (Random Access Memory) device. The RAM and ROM store processing results and control programs that are run by the controller 32. The controller 32 is operatively coupled to the various components of the communication terminal 12 as appropriate, in a conventional manner. It will be apparent to those skilled in the art from this disclosure that the precise structure and algorithms for the controller 32 can be any combination of hardware and software that will carry out the functions of the present disclosure.

The memory 46 can include, for example, an internal memory in the communication terminal 12, or other types of memory devices such as a flash memory or hard drives with external high speed interface such as a USB bus or an SATA bus, or remote memories such as cloud storage and so on. These other types of memory can be present at the terminal 12 or accessible at a location apart from the terminal 12 via a network connection such as an Ethernet connection, a WiFi connection or any other suitable type of connection as understood in the art. Moreover, the memory 46 can include at least one buffer which is configured to buffer, for example, received data packets transmitted from the gateway 16.

In the illustrated embodiment, the communication terminal 12 includes at least one of a transmitter 34 and a receiver 36. The transmitter and the receiver are configured for transmission of communications. More specifically, the transmitter and the receiver are configured for satellite communications with the gateway 16 via the satellite 14. The communications can include data packets. The transmitter 34 and the receiver 36 can be separate components or can both be part of a single transceiver 38. Thus, in an embodiment, a transceiver 38 includes the transmitter 34 and the receiver 36. A transceiver 38 can include, for example, an integrated satellite modem and any other suitable equipment which enables the transceiver 38 to communicate with one or more of the orbiting satellites 14 as understood in the art. The transmitter 34 and/or the receiver 36 can also be coupled to and/or be part of an antenna, which can be included as part of the communication terminal 12 or can be an external antenna that is attached to the communication terminal 12 via an antenna port.

The transmitter 34 is configured to send communications from the communication terminal 12. More specifically, the transmitter 34 is configured to send communications from the communication terminal 12 to the gateway 16 via the satellite 14. Phase noise caused by vibrations applied to the communication terminal 12 can affect the transmitter's 32 error vector magnitude, adjacent power and/or in orthogonal frequency division multiplexing inter carrier interference. The error vector magnitude can affect the accuracy of the phase being transmitted by the transmitter 34.

The receiver 36 is configured to receive communications at the communication terminal 12. More specifically, the receiver 36 is configured to receive communications from the gateway 16 via the satellite 14. Phase noise caused by vibrations applied to the communication terminal 12 can affect the receiver's 34 bit error rate, acquisition, linearity and timing.

In the illustrated embodiment, the communication terminal 12 includes a local server 40. The local server 40 is configured to communicate with an access point, such as a wireless application protocol (WAP) or any other suitable device, which enables the local server 40 to enable end user devices to access the system 10. Such end user devices include, for example, desktop computers, laptop or notebook computers, tablets (e.g., iPads), smart phones, smart TVs and any other suitable devices as understood in the art. Naturally, the communications between the local server 40 and the access point and/or the end user devices can occur over wireless connections, such as WiFi connections, as well as wired connections as understood in the art.

In the illustrated embodiment, the communication terminal 12 includes a power source 42. The power source 42 is configured to provide power to one or more components of the communication terminal 12. More specifically, the power source 42 is configured to provide power to one or more of the common reference device 26, the vibration sensor 28, the controller 42, the transmitter 34 and/or the receiver 36 (e.g., the transceiver 38), the local server 40 and/or other components. The power source 42 can include a battery. The power source 42 can also include a port or wireless device which receives power from an external power source, for example, by being plugged into the external power source. In an embodiment, the controller 32 controls power distribution from the power source 42 to one or more components of the communication terminal 12. In an embodiment, the controller 32 controls power distribution from the power source 42 to adjust the control voltage applied to the common reference device 26.

Figure 3:
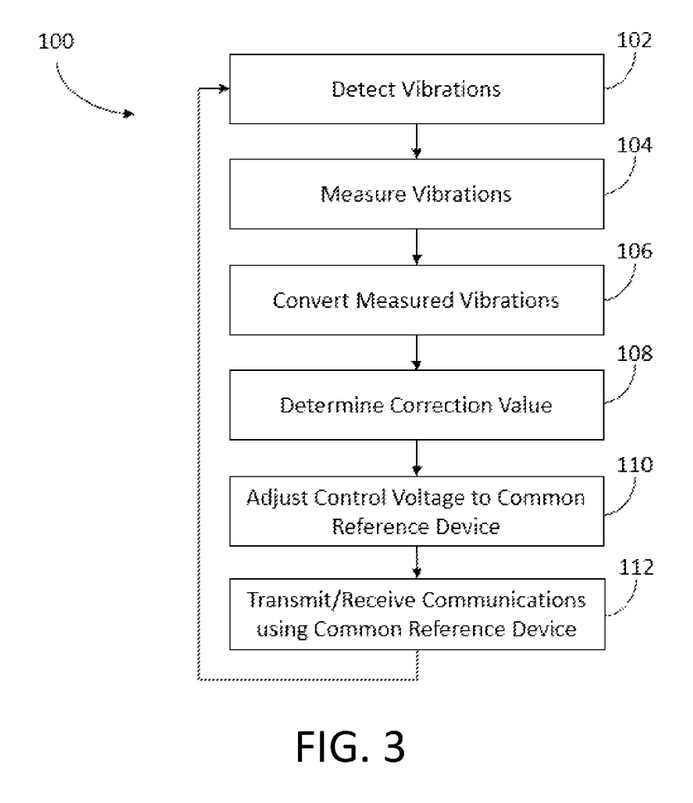
FIG. 3 illustrates an example embodiment of a method of operating a communication terminal in accordance with the present disclosure.

FIG. 3 illustrates an example embodiment of a method 100 of transmitting or receiving communications by a communication terminal 12 experiencing vibrations. The steps of the method 100 can be executed by the controller 32, for example, by being stored as instructions on the memory 46 and executed by the processor 44. It should be understood that some of the steps described herein can be reordered or omitted without departing from the spirit or scope of the method 100.

Prior to executing the method 100, the communication terminal 12 is calibrated. Calibration can occur prior to the communication terminal 12 being dispatched into the field for use (e.g., prior to being attached to a mobile vehicle or nonmobile structure which experiences vibrations). During calibration, the common reference device 26 is characterized. Specifically, the common reference device 26 is characterized to determine how the common reference device 26 is affected by the amplitude, frequency and/or mode of vibrations in each of the X, Y and Z axes. The calibration can be performed by vibrating the common reference device 26 along each of the X, Y and Z axes to determine how the common reference device 26 is affected by the amplitude, frequency and/or mode of vibrations in each of the X, Y and Z axes. The X, Y and Z axes can be determined with reference to an edge of the common reference device 26 and/or the communication terminal 12. In an embodiment, the common reference device 26 can be calibrated prior to being installed into a communication terminal 12, with the common reference device 26 then installed into the communication terminal so that the X, Y and Z axes used for calibration align with the X, Y and Z axes of the communication terminal 12 (e.g., using an edge 22 for reference). In an embodiment, calibration can be performed using one common reference device 26 and applied to other common reference devices 26, such that each common reference device 26 does not need to be individually calibrated. In an embodiment, the calibration is performed by the manufacturer of the common reference devices 26, which may be different from the manufacturer of the communication terminal 12.

The vibration sensor 28 can also be calibrated prior to being installed into the communication terminal 12. The calibration can be performed to determine the X, Y and Z axes of the vibration sensor 28. In an embodiment, the vibration sensor 28 can be calibrated prior to being installed into a communication terminal 12, with the vibration sensor 28 then installed into the communication terminal so that the X, Y and Z axes used for calibration align with the X, Y and Z axes of the communication terminal 12 (e.g., using an edge 22 for reference). In an embodiment, the vibration sensor 28 is installed into the communication terminal 12 so as to be located adjacent to the common reference device 26 such that the calibrated X, Y and Z axes of the vibration sensor 28 align with the X, Y and Z axes of the common reference device 26. In an embodiment, the X, Y and Z axes of the vibration sensor 28 and the X, Y and Z of the common reference device 26 are both aligned with the X, Y and Z axes of the communication terminal 12 (e.g., using an edge 22 for reference). In an embodiment, calibration can be performed using one vibration sensor 28 and applied to other vibration sensors 28, such that each vibration sensor 28 does not need to be individually calibrated. In an embodiment, the calibration is performed by the manufacturer of the vibration sensors 28, which may be different from the manufacturer of the communication terminal 12. The communication terminal 12 can further optionally be calibrated once the vibration sensor 28 has been installed to verify that the X, Y and Z axes are aligned and/or by further performing the method 100 at different vibrations to ensure that the corrections applied by the controller 32 function accurately.

The method 100 illustrated in FIG. 2 begins as the communication terminal 10 is being used in a mobile or other vibrating application and thus experiencing vibrations. The vibrations can occur in one or more of the X, Y and Z directions. In most circumstances, the vibrations will likely occur in all three of the X, Y and Z directions. The X, Y and Z directions can be in relation to one or more edge 22 of the communication terminal 12 as discussed herein.

At step 102, the communication terminal 12 detects vibrations. Specifically, the vibration sensor 28 detects that the communication terminal 12 is vibrating. In embodiment, the vibration sensor 28 detects the level of vibrations in at least one of the X, Y and Z directions. In an embodiment, the controller 32 only triggers step 104 of the method 100 if a minimum level of vibrations is detected in at least one of the X, Y and Z directions. In an embodiment, the controller 32 only triggers step 104 of the method 100 if vibrations are detected in at least one of the X, Y and Z directions for a minimum period of time. In another embodiment, the controller 32 triggers step 104 of the method 100 upon any detected vibrations.

At step 104, the communication terminal 12 measures the vibrations experienced by the communication terminal 12 in at least one axis. More specifically, the vibration sensor 28 measures the vibrations and outputs a corresponding signal to the controller 32. The signal can indicate, for example, the amplitude of vibrations in one or more respective axis, the frequency of vibrations in one or more respective axis, and/or the mode of vibrations in one or more respective axis. In an embodiment, the vibration sensor 28 measures the vibrations experienced by the communication terminal 12 in each of the X, Y and Z axes and outputs one or more corresponding signal to the controller 32 for each of the X, Y and Z axes.

At step 106, the communication terminal 12 converts the measured vibrations into sensitivity values. The measured vibrations can be converted into sensitivity values by the vibration sensor 28 and/or by the controller 32. In an embodiment, the measured vibrations are converted into sensitivity values for each of the X, Y and Z directions. Thus, the communication terminal 10 has a sensitivity value in the X axis (A), a sensitivity value in the Y axis (B), and a sensitivity value in the Z axis (C). In an embodiment, the sensitivity values are weight factors that are dependent on the level of the vibrations. In an embodiment, the sensitivity value for each axis is proportional to the amount of phase noise generated by the vibrations in that axis. In an embodiment, each sensitivity value is determined based on the amplitude of vibrations in a respective axis, the frequency of vibrations in a respective axis, and/or the mode of vibrations in a respective axis. The shape of the communication terminal 12 and the location of the common reference device 26 within the communication terminal 12 can affect which axis has the highest sensitivity value.

At step 108, the controller 32 determines a total error based on the measured vibrations. In an embodiment, the controller 32 determines the total error based on the detected vibrations in each of the X, Y and Z axes. More specifically, the controller 32 calculates the total error by combining the sensitivity values. In an embodiment, the controller 32 is configured to use a method of goodness to calculate the total error for optimizing performance of the common reference device 26. In an embodiment, the controller 32 combines the vibration values using the following equation:

$$\vec{E}=A*\vec{E}_x+B*\vec{E}_y+C*\vec{E}_z \quad \text{(Equation 1)}$$

In Equation 1, $\vec{E}$ is a total error vector, $\vec{E}_x$ is an error vector in the X direction, $\vec{E}_y$ is an error vector in the Y direction, and $\vec{E}_z$ is an error vector in the Z direction. Each of the error vectors can be indicated by a low-pass filter 30 of the output from the vibration sensor 28, as illustrated for example by FIG. 4. A is the sensitivity value in the X direction, B is the sensitivity value in the Y direction, and C is the sensitivity value in the Z direction.

Figure 5:
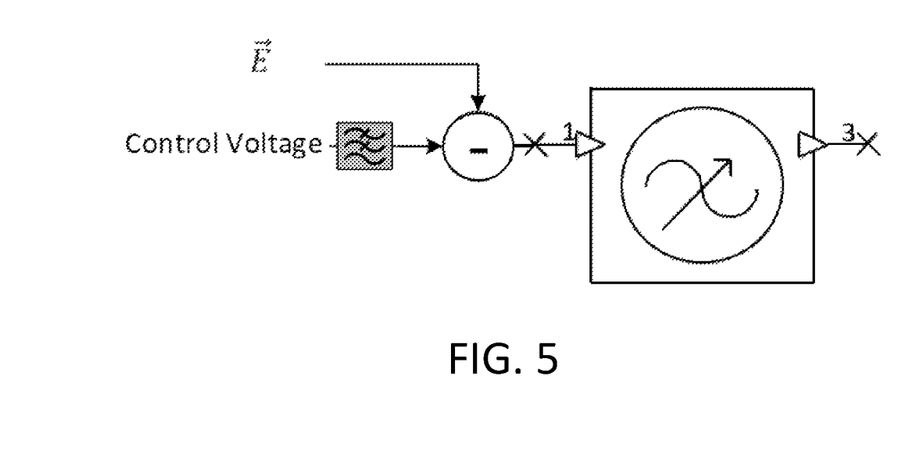
FIG. 5 illustrates an example embodiment of the adjustment of the control voltage to the common reference device of the communication terminal of FIG. 2.
Figure 6:
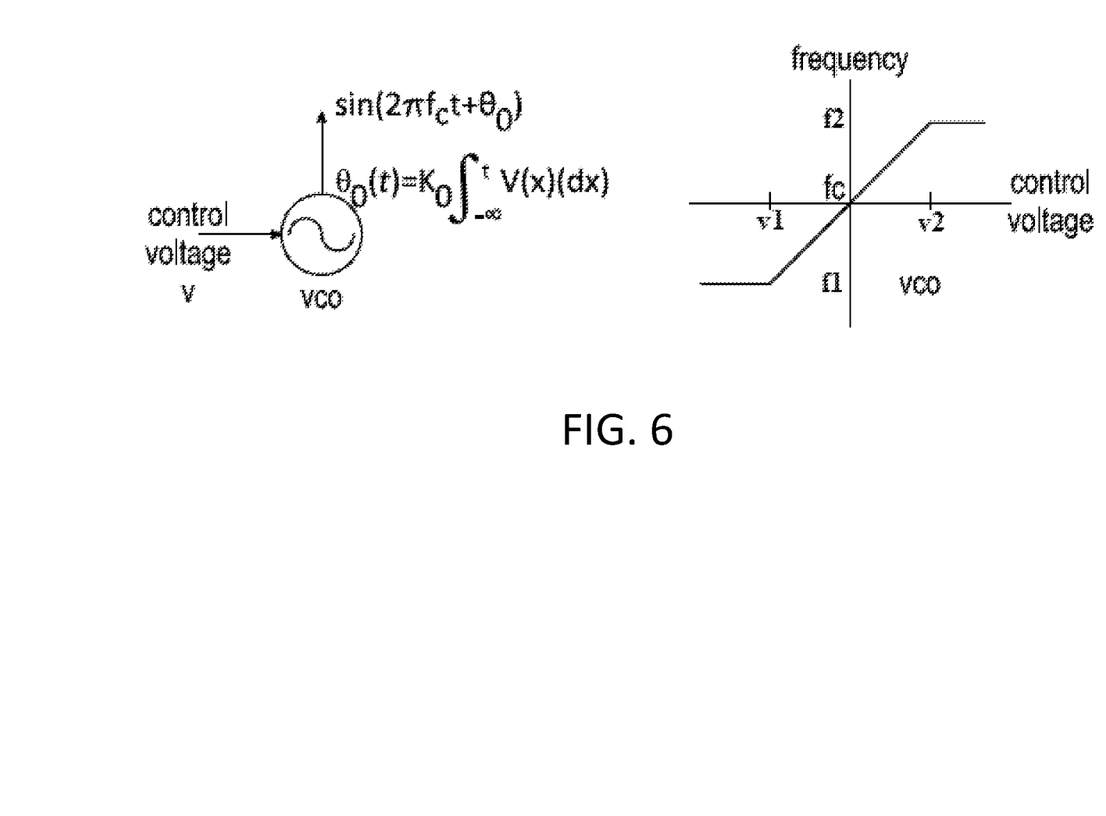
FIG. 6 illustrates an example embodiment of the output of the common reference device of the communication terminal of FIG. 2 being the integral of the control voltage.

At step 110, the controller 32 adjusts the control voltage to the common reference device 26 based on the calculated total error (e.g., the total error vector). More specifically, the controller 32 adjusts the magnitude of the voltage applied to the common reference device 26 based on the total error (e.g., the total error vector). By adjusting the magnitude of the voltage applied to the common reference device 26, the controller 32 causes the common reference device 26 to shift its oscillating frequency. More specifically, since the applied voltage is based on the vibrations detected by the vibration device 28, the controller 32 causes the common reference device 26 to shift its oscillation frequency to account for the vibrations detected by the vibration device 28. FIG. 5 illustrates an example embodiment of the adjustment of the control voltage to the common reference device 26. FIG. 6 illustrates an example embodiment of the output of the common reference device 26 being the integral of the control voltage.

An example embodiment of equations that can be used to correct the phase error are as follows:

$$\vec{\theta}(t) = k_0 \int_{-\infty}^{T} \vec{v_{(x)}} dx \quad \text{(Equation 2)}$$

$$\vec{v_{(x)}} = v(x) - \vec{E}(x) \quad \text{(Equation 3)}$$

From Equations 2 and 3 the magnitude and phase can be calculated and applied to the common reference device 26.

At step 112, the communication terminal 12 sends or receives one or more communication using the common reference device 12 for at least one of the frequency or timing of the communication. In an embodiment, communication terminal 12 sends or receives the communication using the common reference device 26 for the frequency of the communication. For example, certain signal protocols rely on the communication terminal 12 and the gateway 16 operating on the same frequency for the transmission and reception of a communication. In an embodiment, communication terminal 12 sends or receives the communication using the common reference device 26 for the timing of the communication. For example, certain signal protocols rely on the communication terminal 12 and the gateway 16 having accurate timing for the transmission and reception of a communication. The controller 32 is configured to send and/or receive communications by controlling the transmitter and/or receiver 36 (e.g., transceiver 38) using the common reference device 12 as a reference. Thus, the communications can be sent or received from a mobile vehicle including the communication terminal 12 while the mobile vehicle is experiencing vibrations.

The method 100 is continuously performed by the communication terminal 12 during its use. This enables the communication terminal 12 to continue to adjust the control voltage to the common reference device 26 as the vibrations change and/or shift directions in relation to the X, Y and/or Z axes. In this way, the communication terminal 12 constantly adjusts the oscillation frequency of the common reference device 26 to ensure that the timing of communications sent and/or received is always accurate, whether or not the communication terminal 12 experiences vibrations. A communication terminal 12 may degrade with continued use or experience different vibrations under different circumstances, so the applied voltage needed to correct for vibrations in a first instance is not necessarily the same as the applied voltage needed to correct for vibrations in a second instance.

In an embodiment, the method 100 can be triggered by the gateway 16 in response to a detection that the timing and/or frequency of the communication terminal 12 is off.

The embodiments described herein provide improved systems and methods for communication terminals 12 that are installed in locations that experience vibrations. These include law enforcement applications, emergency applications, fleet management applications, military applications and commercial applications (e.g., marine, railroad, etc.). These also include oil well and other nonmobile applications that experience vibrations. The improved systems and methods ensure accurate timing for communications even during periods of extreme vibrations that would otherwise cause the communication terminal 12 to fail. It should be understood that various changes and modifications to the systems and methods described herein will be apparent to those skilled in the art and can be made without diminishing the intended advantages.

The embodiments described herein can be employed in, for example, the Ligado and 9410 mobile satellite terminals made by Hughes Network Systems, as well as any present or future mobile satellite terminal or other type of satellite communication system as understood in the art.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A communication terminal comprising:
   at least one of a transmitter or a receiver configured for transmission of communications;
   a common reference device configured to provide a common reference for at least one of frequency or timing of the communications sent or received by the at least one of the transmitter or the receiver;
   a vibration sensor configured to detect vibrations; and
   a controller configured to adjust a control voltage applied to the common reference device based on a total error determined from sensitivity values for multiple vectors based on the vibrations detected by the vibration sensor.

2. The communication terminal of claim 1, wherein the transmitter and the receiver are configured for satellite communications with a gateway.

3. The communication terminal of claim 1, wherein the common reference device includes a crystal oscillator.

4. The communication terminal of claim 1, wherein the vibration sensor includes a piezoelectric sensor.

5. The communication terminal of claim 1, comprising a transceiver including the transmitter and the receiver.

6. The communication terminal of claim 1, wherein the vibration sensor is configured to detect the vibrations in each of X, Y and Z axes.

7. The communication terminal of claim 1, wherein the controller is configured to determine the total error based on vibrations detected by the vibration sensor in each of X, Y and Z axes.

8. The communication terminal of claim 1, wherein the controller is configured to cause the common reference device to shift an oscillating frequency by adjusting the control voltage applied to the common reference device.

9. A method of transmitting or receiving communications by a communication terminal experiencing vibrations, the method comprising:
   measuring vibrations experienced by the communication terminal in multiple axes;
   determining a total error from sensitivity values for multiple vectors based on the measured vibrations;
   adjusting a control voltage applied to a common reference device based on the total error; and
   sending or receiving one or more communication using the common reference device for at least one of frequency or timing of the one or more communication.

10. The method of claim 9, comprising
    measuring vibrations experienced by the communication terminal in each of X, Y and Z axes, and
    determining the total error based on the detected vibrations in each of the X, Y and Z axes.

11. The method of claim 9, comprising
    transmitting or receiving the one or more communication using the common reference device for the frequency of the one or more communication.

12. The method of claim 9, comprising
    transmitting or receiving the one or more communication using the common reference device for the timing of the one or more communication.

13. The method of claim 9, comprising
    transmitting or receiving the one or more communication from a mobile vehicle including the communication terminal.

14. The method of claim 9, comprising
    causing the common reference device to shift an oscillating frequency by adjusting the control voltage applied to the common reference device.

15. A satellite communication system comprising:
    at least one communication terminal installed at a location that experiences vibrations, the at least one communication terminal including a common reference device configured to provide a common reference for at least one of frequency or timing of communications sent or received by the at least one communication terminal;
    at least one satellite; and
    at least one gateway configured to communicate with the at least one communication terminal via the at least one satellite,
    the at least one communication terminal configured adjust a control voltage applied to the common reference device based on a total error determined from sensitivity values for multiple vectors based on detected vibrations and thereafter use the common reference device during transmission of communications with the at least one gateway via the at least one satellite.

16. The system of claim 15, wherein
    the at least one communication terminal is configured to detect vibrations in each of X, Y and Z axes, determine the total error based on the sensitivity values for the multiple vectors based on the detected vibrations in each of the X, Y and Z axes, and adjust the control voltage applied to the common reference device based on the total error.

17. The system of claim 15, wherein
    the common reference device includes a crystal oscillator.

18. The system of claim 15, wherein
    the at least one communication terminal is installed on a mobile vehicle.

19. The communication terminal of claim 1, wherein
    the sensitivity values include weight factors dependent on levels of the vibrations detected by the vibration sensor.

20. The communication terminal of claim 1, wherein
    the sensitivity values are proportional to amounts of phase noise generated by vibrations in multiple axes.

* * * * *